United States Patent

[11] 3,524,402

[72] Inventors Gerhard Bosewitz
Falkensee near Berlin, Germany;
Helmut Ehlies, Berlin-Kopenick, Germany; Rudolf Dickscheit, Berlin-Karolinenhof, Germany
[21] Appl. No. 585,863
[22] Filed Oct. 11, 1966
[45] Patented Aug. 18, 1970
[73] Assignee Institut fur die Garungs-und Getrankeindustrie
Berlin, Germany
a concern of Germany

[54] APPARATUS FOR TREATING BEER WORTS
2 Claims, 1 Drawing Fig.
[52] U.S. Cl. .................................................. 99/276,
99/31
[51] Int. Cl. .................................................. C12g 1/06
[50] Field of Search .......................................... 99/275,
276, 277, 277.1, 277.2; 195/128, 132, 133; 99/31, 32

[56] References Cited
UNITED STATES PATENTS
| | | | |
|---|---|---|---|
| 963,458 | 7/1910 | Moeller ...................... | 99/276 |
| 3,071,469 | 1/1963 | Krabbe ....................... | 99/277.1 |
| 3,201,328 | 8/1965 | Williams ..................... | 99/276X |
| 3,207,606 | 9/1965 | Williams ..................... | 99/276X |

*Primary Examiner*— Robert W. Jenkins
*Attorney*—Richards and Geier

ABSTRACT: Beer worts are treated by being cleaned and sterilized, then enriched with yeast cells and then fermented while being exposed to ventilation and over-pressure. Thereupon carbon dioxide is supplied to impede further yeast increase, whereby new beer is produced. The yeast is precipitated and a part of the precipitated yeast is returned to the worts about to be fermented. New beer is subject to accelerated ripening and washing with carbon dioxide at varying pressures.

Patented Aug. 18, 1970
3,524,402
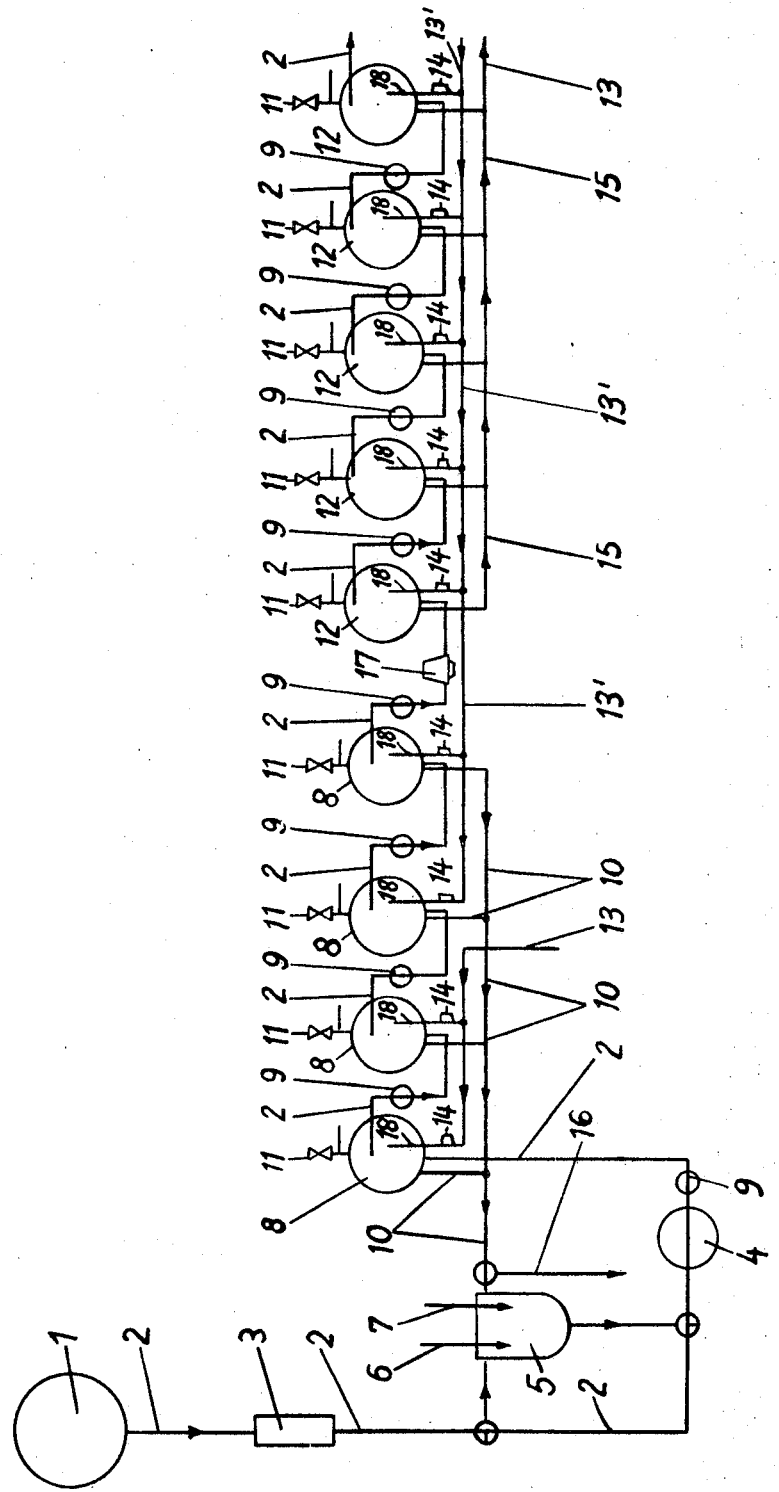
INVENTORS
GERHARD BOSEWITZ
HELMUT EHLIES
RUDOLF DICKSCHEIT
BY Richards & Geier
ATTORNEYS

APPARATUS FOR TREATING BEER WORTS

This invention relates to an apparatus for treating beer worts and refers more particularly to an apparatus for accelerated continuous fermentation and ripening of beer worts.

The usual procedure for the fermentation and ripening of beer worts is generally a discontinuous one and it requires a great deal of time, space and apparatus installations.

Therefore, attempts have already been made to eliminate these drawbacks by making the process continuous; thus it is generally known to carry out continuously processes of alcoholic fermentation and to influence the speed of fermentation by increasing the yeast concentration and raising the generally used fermentation temperatures.

It is known that various attempts have been made to introduce continuous fermentation into the making of beer, but all such attempts referred to progressing fermentations carried out with charges, wherein fresh wort is added to partially fermented wort while at the same time higher temperatures are applied than those normally used.

A process is also known wherein a column of a sugar-containing liquid is kept in a closed standing container for the purpose of fermentation (so-called tower fermentation), which is carried out in steps proceeding from the bottom to the top. Stirrers are used to maintain the liquid in a homogenous state. It is not possible, however, to attain a desired extent of fermentation in this process since, due to the turbulent flow, unfermented wort leaves the tower along with the fermented one.

It is also known to make beer in a row of interconnected containers, whereby the wort is placed into the first container and fermented beer is withdrawn from the last container. Fermentation tanks used in this process contain special devices which serve to accelerate the fermentation and clarify the new beer. The ripening is then partly accomplished by the fact that the fermenting wort is kept for 18 days in a fermentation installation composed of 7 containers of different sizes and is then maintained for 6 to 9 days in storage containers. In the course of this process the second and third containers are subjected to different pressures since the main fermentation is carried out following the principle of pressure gradient.

In order to provide a quicker fermentation, the wort has already been subjected to a continuous stirring by one or several propellers, so that the yeast is kept floating. In the course of this process the continuously inflowing unfermented wort is mixed along with the already fermented wort, so that it is not possible to provide uniformly fermented wort at the end of the fermentation installation.

The installation used for this process consists of a closed fermentation container and a ripening container which are both provided with rotating propellers.

The described process and the installation which is used to carry it out have the drawback that to a large extent only the main fermentation process is a continuous one. The following after-fermentation process for the ripening of the fermented beer is carried out discontinuously, as before.

None of the known processes removes the difficulties encountered during fermentation and ripening so as to obtain the desired goals of diminishing the duration, the consumption of operational forces and the extent of the operational area with simple means. In addition, up to now it was difficult to control the biochemcial changes taking place during the ripening of the beer in a continuous process.

An object of the present invention is to eliminate the above-described drawbacks and to provide a saving in production time, operational forces, container space and energy.

The purpose of the invention is to arrange the fermentation and the ripening taking place during beer production in the shape of a flow line and to eliminate the drawbacks of continuous fermentation and ripening by a special pressure and gas supplying system. Then the yeast must be supplied in an amount necessary for a quicker fermentation and at the same time an excessive increase must be avoided to provide a quicker clarifying and to avoid extract losses. The product which is thus made must be qualitatively at least equal to existing beers and must correspond to the desires of the consumers.

In the accomplishment of these and other objectives of the present invention, beer wort is sterilized and cleansed to the best possible extent and is enriched by yeast cells and is guided through two fermentation tanks, for example, wherein a great yeast increase and thus a quick fermentation by the use of air and over-pressure are produced. This yeast increase is then impeded by $CO_2$ gas application in two other fermentation tanks, for example. The last of said fermentation tanks serves primarily for the sedimentation of yeast. Yeast deposited in all the fermentation tanks is partly guided again for new fermentation in the beer wort prior to its introduction into the first fermentation tank. The new beer produced in the fermentation tanks, after passing these tanks, is subjected to an accelerated ripening in five adjacent tanks, for example, by being washed with $CO_2$ at different pressures.

In accordance with the present invention an apparatus for carrying out this process is provided having, firstly, a collecting container for receiving the cleaned beer wort, as well as a sterilization device, a yeast supplying device and a pressure pump with a following pressure reducing device for the liquid, which are all connected by a conduit for the beer wort with the collecting container. This conduit opens into a lower part of the front of a fermentation tank and leads out of an upper part of the rear of that tank into the next fermentation tank; the same arrangement is preferably used to interconnect two other fermentation tanks and then the five ripening tanks. The first two fermentation tanks are provided with an airing device and all other tanks are provided with a $CO_2$ gas supplying device. All fermentation tanks are provided with yeast removing means leading to a pressure container of the yeast supplying device, while the ripening tanks have sediment removing means.

If necessary, a separator for the new beer can be inserted between the groups of the fermentation tanks and the group of the ripening tanks.

The partial return of yeast deposited in the fermentation tanks and its re-utilization for new fermentation, as envisaged by the present invention, not only provide a saving in the consumption of yeast, but above all result in an exceptional acceleration of the fermentation process. The provided use of $CO_2$ gas prevents an excessive increase in yeast and maintains constant the amount of yeast which has been produced. This avoids extract losses which would develop during a further increase in yeast, through the removal of substances valuable for the yeast build up.

In accordance with the present invention the ripening process is accelerated by washing with $CO_2$, whereby $CO_2$ which has been introduced frees the bound $CO_2$ and provides a quick clarification of beer.

Non-essential special inserts, such as conducting sheets and sedimentation receiving sheets can be eliminated from the tanks altogether.

The present invention makes it possible to produce in a short time of ten days with comparatively little expenditure a beer which does not require any subsequent storage and which qualitatively is at least equal to the existing beers.

The invention will appear more clearly from the following detailed description when taken in connection with the accompanying drawing showing by way of example, a preferred embodiment of the inventive idea.

The sole Figure of the drawing illustrates diagrammatically an apparatus used for carrying out the process of the present invention.

The apparatus of the present invention avoids division into a fermentation chamber and a storage chamber. In accordance with the present invention the main fermentation process passes over into ripening; this shortens the time of production and correspondingly diminishes the work required in connection therewith by eliminating a separation of work into that required for fermentation and that required for the storage chamber.

As shown in the drawing, the wort which has been cleaned to the best possible extent is introduced into a vat or tank serving as a collecting container 1 which can include more than one brew of the brew house in case of stoppages for repairs or pauses in production resulting from other causes. The wort is cooled, cleaned and sterilized. The cleaned wort flows from this wort collecting container 1 through a conduit 2 and through a sterilizing device 3 toward a pressure pump installation 4. The pressure side of the pump 4 has a device 9 for reducing the pressure of the liquid which is adjusted to the pressure prevailing in the fermentation tanks 8.

After flowing through the fermentation tanks the fermenting wort which has been enriched with yeast cells, flows out at a tank height of about 60%-80%. The fermentation tanks can be placed vertically or horizontally.

Preliminary fermentation takes place in the first fermentation tank 8. Since the closed fermentation process takes place under the same pressure or variable pressure, safety devices 11 are provided, each consisting for example, of a saftey valve, manometer and check valve.

Preferably, the fermentation tanks 8 are provided with indicators showing the level of the liquid, so as to control the filling and the filled contents. Wort flowing out of the first fermentation tank 8 passes through the liquid pressure reducing device 9 and enters the second fermentation tank from the bottom. The third and the fourth fermentation tanks shown in the illustrated examples are filled in the same manner by the wort current which flows through them.

While the illustrated fermentation tank battery consists of four tanks, a plurality of tanks can be combined into a single battery depending upon operational requirements. If a tank is removed out of the flow line of tanks, or if a tank is replaced by another one, the conduit 2 for the wort is extended behind the pressure reducer to the tank after the next. The pressure reducers 9 and the safety devices 11 assist in setting the desired pressure or the desired reduction in pressure.

The last fermentation tank of the batter is preferably used for the sedimentation of the wort. The fermented wort flows through an intermediate new beer separator 17, or it can avoid the separator and flow directly into the ripening tanks 12 of a ripening battery.

The drawing shows by way of example, five ripening tanks. However, the number of tanks can be determined depending upon operational requirements. The treatment and the flow arrangement of the beer being ripened make it possible at all times to remove one of the ripening tanks, whereupon the flow of the fermented beer after having passed the pressure reducer is guided to the tank after the next.

The pressure reducers for the liquid and the safety devices are also used in the battery of ripening tanks to maintain the pressure or to provide the desired diminution of pressure.

The ripening of the beer is indicated by a complete termination of the chemical and biochemical processes. The beer can be withdrawn and filled after a total fermentation and ripening period of about ten days.

Carbonic acid deposited during the fermentation can be recovered, treated and then used according to prior art procedures.

To start the fermentation, pitching yeast is introduced into the yeast pressure container 5 through the conduit 7 for the yeast or directly through the inflow conduit 6. Wort out of the conduit 2 is added through a three-way valve for dilution, or this supply may be shut off depending upon yeast concentration.

Pressure, a stirrer or a pump can be used to bring the yeast into a condition which will make it possible to provide a flow between the yeast pressure container 5 and the wort pressure pump 4 with pressure reducer 9 to pitch wort located in the fermentation tanks with yeast. The yeast supply is about 1.0 to 1.5 l/hl. of the first two fermentation tanks. Yeast which is caused to multiply and ferment by the supply of ventilation through conduits 13, 14 and 18 produces the desired overpressure in the first two fermentation tanks. The gas supplying conduits 13', 14 and 18 serve the same purpose for all other tanks.

Yeast precipitated in the battery of fermentation tanks is withdrawn through the yeast removing conduit 10 and is reintroduced into the yeast pressure container 5 for renewed pitching depending upon the requirements of wort pitching, thereby closing the circuit for the supply of yeast to the wort.

The three way valve located in the yeast removing conduit in front of the yeast pressure container 5 directs excessive yeast at will through the conduit 16 either for temporary storage and subsequent additional or new pitching of wort with the yeast, or for complete removal.

Yeast precipitated in the new beer separator 17 can be used at will. It can be reused again by causing it to flow through the circuit containing members 17, 10, 5, 4, 9, 2, 8, 17 or it can be temporarily stored or removed through the described conduit 16.

The gradually increasing sediments in the battery of ripening tanks are removed through the sediment conduits 15 and serve as waste or residuary products.

The supply of gas to the fermentation tanks 8 and the ripening tanks 12 is provided by the gas conduits 13 and 13'. It is regulated by flow indicators 14 built into the gas conduits for each fermentation tank and ripening tank. The supply of gas can be cut off from individual tanks or from a whole series of tanks. A separate conduit connects each gas indicator 14 to a gas supplying device located in each tank. This device makes it unneccessary to provide flow sheets for the flow and the guiding of fermentation and augmented substances. The supply of gas serves at the same time to maintain the required pressure in the batteries of fermentation and ripening tanks. Over-pressure produced in a tank is adjusted to the desired pressure and is maintained at that pressure by its safety device 11.

The connection of the battery of ripening tanks with the battery of fermentation tanks to a continuously flowing production line and the corresponding yeast flow circuit make it possible to maintain an economical storage supply adapted to operational requirements. The ripening tanks can be switched off in rows or individually if special circumstances occur or when the beer has attained its extent of ripening in the flow line.

The present invention permits continuity of production for very long time periods. When corresponding requirements are met, the entire installation makes it possible to mechanize the cleaning and disinfection. Individual tanks can be withdrawn at any time from the flow line and set in prescribed connections for special operations.

It is apparent that the example described above has been given solely by way of illustration and not by way of limitation and that it is capable of many variations and modifications within the scope of the present invention. All such variations and modifications are to be included within the scope of the present invention.

We claim:

1. An apparatus for the accelerated continuous fermentation and ripening of beer worts, comprising a wort-receiving container, a sterilizing device connected with said container, a yeast-receiving container, a pump, conduits connecting said pump with said sterilizing device and said yeast-receiving container, a pressure reducing device connected with said pump, a row of fermentation tanks, a conduit connecting said pressure reducing device with a bottom portion of one of said fermentation tanks, conduits interconnecting top portions of each of said tanks with bottom portions of each following tank, a row of ripening tanks, conduits interconnecting top portions of each of said ripening tanks with bottom portions of each following ripening tank, a ventilating device connected with said one fermentation tank and one other fermentation tank, a CO$_2$-supplying device connected with all other tanks, conduits connecting said fermentation tanks with said yeast-receiving device for the return flow of the yeast, sediment-withdrawing conduits connected with said ripening tanks, and means connecting the last one of the row of fermentation tanks with the first one of the row of ripening tanks.

2. An apparatus in accordance with Claim 1, wherein said means comprise a new beer separator.